United States Patent [19]

Fujii et al.

[11] Patent Number: 4,873,276

[45] Date of Patent: Oct. 10, 1989

[54] POLYPHENYLENE ETHER/POLYAMIDE BLENDS HAVING IMPROVED PHYSICAL PROPERTIES

[75] Inventors: Susumi Fujii, Ibaragi; Hiromi Ishida; Masataka Morioka, both of Tochigi; Akihiro Saito, Utsunomiya, all of Japan; Roelof van der Meer, Halsteren, Netherlands

[73] Assignee: General Electric Company, Selkirk, N.Y.

[21] Appl. No.: 22,836

[22] Filed: Mar. 6, 1987

[30] Foreign Application Priority Data

| Mar. 7, 1986 [JP] | Japan | 61-48504 |
| Apr. 7, 1986 [JP] | Japan | 61-78383 |
| Apr. 22, 1986 [JP] | Japan | 61-91371 |

[51] Int. Cl.$^4$ .............. C08K 5/51; C08L 71/04; C08L 77/00
[52] U.S. Cl. ..................... 524/153; 524/275; 524/278; 524/279; 525/66; 525/68; 525/132; 525/393; 525/396; 525/397
[58] Field of Search ............. 525/397, 396, 393, 132; 524/275, 278, 279, 153

[56] References Cited

U.S. PATENT DOCUMENTS

| 3,379,792 | 4/1968 | Finholt . |
| 3,822,227 | 7/1974 | Hermann et al. . |
| 4,137,212 | 1/1979 | Theysohn et al. . |
| 4,231,910 | 11/1980 | Plueddemann . |
| 4,315,086 | 2/1982 | Ueno et al. . |
| 4,335,126 | 10/1982 | Haaf et al. . |
| 4,339,376 | 7/1982 | Kasahara et al. . |
| 4,383,082 | 5/1983 | Lee, Jr. . |
| 4,600,741 | 7/1986 | Aycock et al. . |

FOREIGN PATENT DOCUMENTS

| 0147874 | 4/1984 | European Pat. Off. . |
| 213364 | 7/1983 | Japan . |
| 8500944 | 12/1985 | World Int. Prop. O. . |

*Primary Examiner*—Jacob Ziegler
*Attorney, Agent, or Firm*—Hedman, Gibson, Costigan & Hoare

[57] ABSTRACT

Compatibilized mixtures of a polyphenylene ether, a polyamide and a compatibilizer are described. The mixtures have improved physical properties as a result of using in the mixtures a polyamide having a terminal amine group to terminal carboxyl group ratio of greater than 1.

27 Claims, 1 Drawing Sheet

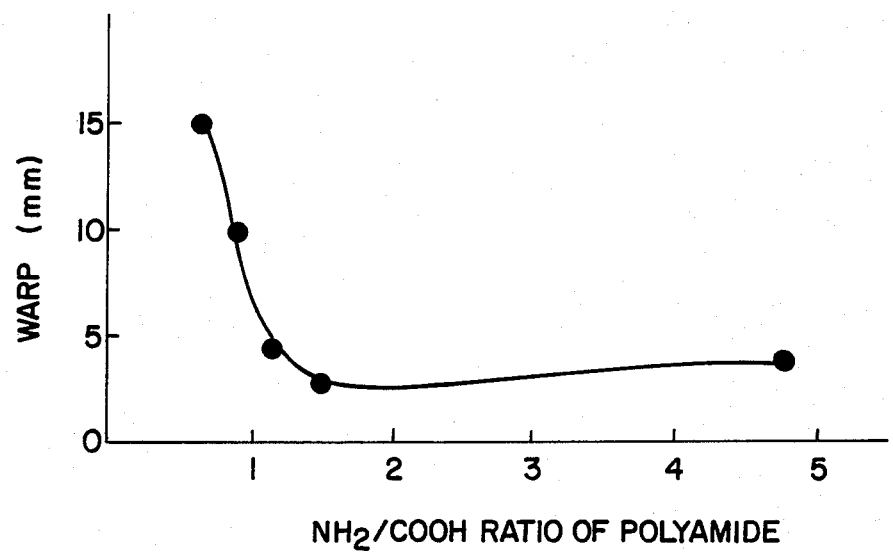
F I G. 1

POLYPHENYLENE ETHER/POLYAMIDE BLENDS HAVING IMPROVED PHYSICAL PROPERTIES

STATEMENT OF THE INVENTION

The present invention relates to a compatibilized resin composition comprising a polyphenylene ether type resin and a polyamide resin. The invention also relates to molded articles prepared from the resin composition, with or without a filler, which show improved properties in surface appearance, impact strength, very small warp and good heat resistance.

BACKGROUND OF THE INVENTION

Polyphenylene ether is useful as a resin material for molding because of its good mechanical and electrical properties. However, it has poor oil-resistance. In order to solve this disadvantage, it is known that polyphenylene ether can be blended with polyamide which is resistant to oil (see, for example, Japanese Patent Laid-Open No. 16525/1981). The resulting composition exhibits improved oil resistance as compared to polyphenylene ether alone. However, polyphenylene ether and polyamide show poor compatibility with each other and, accordingly, properties intrinsic to these two resins, e.g., the excellent mechanical properties, are not fully exhibited when the resins are combined.

In order to improve this, the attempt has been made to enhance impact resistance while obtaining improved oil resistance by adding a compound having (a) a carbon-carbon double or triple bond and (b) a carboxyl, acid anhydride, acid amide, imide, carboxylic ester or epoxy group (Japanese Patent Publication (unexamined) No.56-26913). However, shaped articles prepared from this composition have a tendency to show poor surface appearance.

Finholt (U.S. Pat. No. 3,379,792) discloses polymer blends wherein the processability of polyphenylene ether resins may be improved by blending with from 0.1 to 25% by weight of a polyamide. However, the advantages of the Finholt invention are limited by the fact that when the concentration of the polyamide exceeds 20% by weight, appreciable losses in other physical properties result. Specifically, there is no, or at best poor, compatibility between the polyphenylene ether and the polyamide such that phase separation of the resins occurs on molding or the molded article is inferior in mechanical properties.

Ueno et al. (U.S. Pat. No. 4,315,086) discloses polyphenylene ether blends having improved mechanical resistance without a loss of other mechanical properties by blending therewith a polyamide and a specific compound selected from the group consisting essentially of (A) liquid diene polymers, (B) epoxy compounds and (C) compounds having in the molecule both of (i) an ethylene carbon-carbon double bond or carbon-carbon triple bond and (ii) a carboxylic acid, acid anhydride, acid amide, imide, carboxylic acid ester, amino or hydroxy group.

Finally, Kasahara et al. (EP No. 46040) discloses the use of a copolymer comprising units of a vinyl aromatic compound and either an alpha, beta-unsaturated dicarboxylic acid anhydride or an imide compound thereof as a modifier to an impact resistant polyphenylene ether-polyamide blend for improved heat resistance and oil resistance.

Aycock et al. (U.S. Pat. No. 4,600,741) discloses the use of an acyl functional compatibilizer, preferably the reaction product of polyphenylene ether with trimellitic anhydride acid chloride, for polyphenylene ether-polyamide blends.

BRIEF DESCRIPTION OF THE DRAWING

The FIGURE is a graph showing relation between a terminal group ratio of polyamide and a warp.

DESCRIPTION OF THE INVENTION

It has now been found that in a compatibilized resin composition comprising (a) a polyphenylene ether type resin, (b) a polyamide resin, and (c) a compatibilizer for (a) and (b) and, additionally if desired the below-described optional materials mechanical strength, such as impact resistance, and surface appearance of a molded article of the resin composition are improved, while maintaining oil resistance of the molded article by the use of a polyamide resin in which the amount of terminal amino group is greater than the amount of terminal carboxyl group.

The compositions of the present invention also exhibit lower warp in a molded article prepared from a compatibilized resin composition comprising (a) a polyphenylene ether type resin, (b) a polyamide resin, (c) a compatibilizer for (a) and (b) and a filler, and such compositions exhibit improved mechanical strength. This is attained by the use of a polyamide resin having the above-mentioned particular terminal group ratio in the aforesaid resins/filler composition.

Thus, the present invention provides a compatibilized resin composition comprising:
 (a) a polyphenylene ether resin
 (b) a polyamide resin in which the amount of terminal amino group is greater than the amount of terminal carboxyl group, and
 (c) a compatibilizer compound for (a) and (b).

Preferably, the compatibilized resin compositions of the present invention comprise:
 (a) 5 to 80 parts by weight of a polyphenylene ether type resin,
 (b) 95 to 20 parts by weight of a polyamide resin in which the amount of terminal amino group is greater than the amount of terminal carboxyl group, and
 (c) 0.01 to 10 parts by weight of a compatibilizer compound based upon the total amount of components (a) and (b).

The compatibilized resin compositions of the present invention, in addition to components (a), (b) and (c), can further comprise:
 optionally, (d) a rubbery material,
 optionally, (e) a filler,
 optionally, (f) a flame retardant, and
 optionally, (g) an antimony-compound.

These optional components can be used singly or in any combination and the preferred amount of optional components are:
 optionally, (d) 0 to 20 parts by weight of a rubbery material per 100 parts by weight of the total amount of components (a) and (b),
 optionally, (e) 5 to 150 parts by weight of a filler per 100 parts by weight of the total amount of components (a) and (b),
 optionally, (f) 0 to 40 parts by weight of a flame retardant per 100 parts by weight of the total amount of components (a) and (b), and optionally, (g) 0 to 20 parts by weight of an antimony compound per 100 parts by weight of the total amount of components (a) and (b).

The polyphenylene ether type resin used herein is known per se and is generically defined by the general formula:

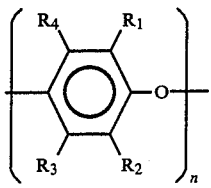

wherein $R_1$, $R_2$, $R_3$ and $R_4$ are a monovalent substituent selected from a hydrogen atom, a halogen atom, an alkyl group, an alkoxy group, a haloalkyl and haloalkoxy group in which at least 2 carbon atoms are present between a halogen atom and a phenyl ring with the exclusion of those having tertiary alpha-carbon atoms and n is an integer representing the degree of polymerization and is preferably at least 50. The polymer may be a homopolymer or a copolymer of two or more comonomers represented by the above general formula. In preferred examples $R_1$ and $R_2$ are an alkyl group of 1 to 4 carbon atoms, and $R_3$ and $R_4$ are a hydrogen atom or an alkyl group of 1 to 4 carbon atoms. Exemplary preferable polyphenylene ethers are poly(2,6-diethyl-1,4-phenylene) ether, poly(2-methyl-6-ethyll,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly (2-ethyl-6-propyl-1,4-phenylene) ether, and poly(2,6-dipropyl-1,4-phenylene) ether. Particularly preferred is poly(2,6-dimethyl-1,4-phenylene) ether.

A typical polyphenylene ether copolymer is a copolymer in which a part of the aforesaid polyphenylene ether recurring unit is replaced with tri-alkyl substituted phenol, such as 2,3,6-trimethyl phenol.

Further, styrene type compounds may be grafted onto these polyphenylene ethers to yield copolymers. Illustrative of styrene type compound-grafted polyphenylene ethers are copolymers grafted with styrene, alpha-methyl styrene, vinyl toluene and chlorostyrene.

Polyamide resins are known per se. Polyamides suitable for the preparation of the compositions of the present invention may be obtained by polymerizing a monoaminomonocarboxylic acid or a lactam thereof having at least 2 carbon atoms between the amino and carboxylic acid group; or by polymerizing a diamine which contains at least 2 carbon atoms between the amino groups and a dicarboxylic acid; or by polymerizing a monoaminocarboxylic acid or a lactam thereof as defined above together with a diamine and a dicarboxylic acid. The dicarboxylic acid may be used in the form of a functional derivative thereof, for example an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned gamma-aminocaproic acid, butyrolactam, pivalolactam, caprolactam, capryllactam, enantholactam, undecanolactam, dodecanolactam and 3- and 4-aminobenzoic acids.

Examples of diamines suitable for preparing the polyamides include diamines of the general formula

wherein n is an integer of from 2 to 16, such as trimethylenediamine, tetramethylenediamine, pentamethylenediamine, octamethylenediamine and especially hexamethylenediamine.

The dicarboxylic acids may be aromatic, for example isophthalic and terephthalic acids. Preferred dicarboxylic acids are of the formula

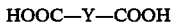

wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example polyamides 6, 6/6, 11, 12, 6/3, 6/4, 6/10 and 6/12 as well as polyamides resulting from terephthalic acid and trimethyl hexamethylene diamide, polyamides resulting from solipic acid and meta xylylenediamines, polyamides resulting from adipic acid, azelaic acid and 2,2-bis-(p-aminocyclohexyl) propane and polyamides resulting from terephthalic acid and 4,4'-diaminodicyclohexylmethane. Preferred polyamides are the polyamides 6, 6/6, 4/6, 11 and 12, most preferably polyamides 6/6 or polyamide 6.

In the present invention, what is essential is that the amount of terminal amine group is greater than the amount of terminal carboxylic group in the polyamide. Such polyamides may be obtained by adding an excessive amount of, for instance, compounds having a group reactive with a carboxylic group, such a diamines, to a polymerization system of the polyamide. Alternatively, such polyamides may be obtained by reacting the polyamide with, for instance, compounds having a group reactive with a carboxylic group after polymerization of the polyamide. The terminal amine group is present also in a minimum amount sufficient to interact with the compatibilizer, component (c), to help effect compatibilization between (a) and (b).

Polyphenylene ethers, component (a), and polyamides in which the amount of terminal amino group is greater than the amount of a terminal carboxyl group, component (b), are blended in any proportion, preferably in a range of 5 to 80 parts by weight and a range of 95 to 20 parts by weight, respectively. If the amount of component (b) exceeds the above limitation, the desired properties of component (a) are difficult to maintain. On the other hand, if the amount of component (b) falls below the lower limit, the purpose of adding component (b), i.e., improvement of the oil resistance level, is difficult to attain. Preferably, a weight ratio of component (a) to component (b) is 30 to 70 : 70 to 30.

For best results, component (c) is blended in an amount of 0.01 to 10 parts by weight, preferably 0.01 to 5 parts by weight, more preferably 0.1 to 2 parts by weight, to each 100 parts by weight of the total of components (a) and (b). If the amount is less than 0.01 parts by weight, the desired effect as a compatibilizer is not attained. On the other hand, if the amount exceeds 10 parts by weight, surface appearance of the molded article is sometimes poor. Component (c) of the present invention can be any compound or group of compounds known to effect compatibility between a polyphenylene ether resin, component (a), and a polyamide resin, component (b). Mixtures of compatibilizers can be used.

Suitable compatibilizers preferably include:
(i) a compound having (1) one or more of a carbon-carbon double or triple bond and (2) one or more functional groups selected from a carboxyl, acid anhydride, acid amide, imide, carboxylic ester or epoxy group;
(ii) a saturated aliphatic polycarboxylic acid or derivative thereof;
(iii) a silane compound having in its molecular structure both (a) at least one silicon atom which is bonded to a carbon atom via an oxygen bridge and (b) at least an ethylene carbon-to-carbon double bond or a carbon-to-carbon triple bond and/or a functional group selected from an amine group and a mercapto group, the functional group not being bonded directly to the silicon atom;
(iv) a functionalized polyphenylene ether consisting of a reaction product of (a) a polyphenylene ether and (b) a compound of the general formula (i)—Z—(ii), wherein (i) is at least a group of the formula [X—C(O)] with X=F, Cl, Br, I, OH, —OR, or —O—C(O)—R with R=H, alkyl or aryl, wherein (ii) is at least a carboxylic acid, acid anhydride, acid amide, imido, carboxylic acid ester, amino or hydroxyl group, and in which the groups (i) and (ii) are covalently bonded together via a bridge Z, Z being a bivalent hydrocarbon radical;
(v) an oxidized polyolefin wax, optionally in combination with an organic phosphite;
(vi) a copolymer with units of a vinylaromatic compound and of an alpha-beta unsaturated dicarboxylic acid or dicarboxylic acid anhydride or a copolymer with units of a vinylaromatic compound of an imide compound of an alphabeta unsaturated dicarboxylic acid. This compatibilizer can be present in the preferred amount of from 0.5 to 100 parts by weight per 100 parts by weight of polyamide plus polyphenylene ether; and
(vii) the reaction product of (a) 1,2-substituted olefinic compound with carboxyl group or acid anhydride group, (b) a polyphenylene ether and (c) a radical initiator. This compatibilizer can be present in the preferred amount of from 0.5 to 150 parts by weight per 100 parts by weight of polyamide plus polyphenylene ether.

The agents for improving the compatibility mentioned in (iv) and (vii) can replace the polyphenylene ether, component (a) in the polymer mixtures according to the invention, entirely or partly.

Component (c) used in the present invention when of type (i) includes maleic anhydride, maleic acid, fumaric acid, maleimide, maleic hydrazide, reaction products of maleic anhydride with diamines such as those having the following structures

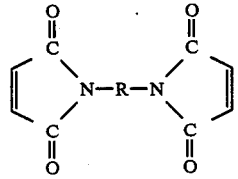

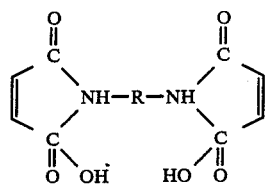

(wherein R represents an aliphatic or aromatic group), methyl nadic anhydride, dichloromaleic anhydride, maleic amide, natural oils such as soy bean oil, tung oil, castor oil, linseed oil, hempseed oil, cottonseed oil, sesame oil, rapeseed oil, peanut oil, tsubaki oil, olive oil, coconut oil and sardine oil, epoxidated natural oils such as epoxidated soy bean oil, unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, alpha-ethylacrylic acid, beta-methylcrotonic acid, 4-pentenoic acid, 2-hexenoic acid, 2-methyl-2-pentenoic acid, 3-methyl-2-pentenoic acid, alphaethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, micolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecediencic acid, hexadecatrienoic acid, linolic acid, linolenic acid, octadecatrienoic acid, eicosadienoic acid, eicosatrienoic acid, eicosatetraenoic acid, recinolic acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid and triacontenoic acid, or esters, acid amides and acid anhydrides of these unsaturated carboxylic acids, adducts of low molecular weight polymers (e.g., average molecular weight of about 500 to 10,000) or high molecular weight polymers (e.g., average molecular weight 10,000 or more) of, for instance, butadiene and isoprene and isoprene with maleic anhydride, or derivatives of these polymers in which a carboxyl group or epoxy group is introduced.

Compound (c) may have two or more of the aforesaid unsaturated bonds (1) and/or two of more of the aforesaid functional groups (2).

Component (c) used in the present invention, when of type (ii), the saturated aliphatic polycarboxylic acid or a derivative thereof, is represented by the formula:

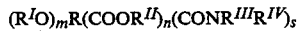

wherein R is a linear or branched chain, saturated aliphatic hydrocarbon of from 2 to 20, preferably 2 to 10, carbon atoms; $R^I$ is selected from the group consisting of hydrogen, alkyl, aryl, acyl and carbonyl and dioxy group of 1 to 10, preferably 1 to 6, more preferably 1 to 4, carbon atoms, most preferably hydrogen; $R^{II}$ is selected from the group consisting of hydrogen, alkyl and aryl group of from 1 to 20 carbon atoms, preferably from 1 to 10 carbon atoms; each of $R^{III}$ and $R^{IV}$ is selected from the group consisting of hydrogen, an alkyl and aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and (OR$^j$) is in an alpha or beta position to a carbonyl group and at least two carbonyl groups are separated by 2 to 6 carbon atoms.

Examples of the derivatives of the saturated aliphatic polcarboxylic acids according to the invention include esters, amides, anhydrides, hydrates and salts of the saturated aliphatic polycarboxylic acids. Illustrative of the saturated aliphatic polycarboxylic acids are citric acid, malic acid and agaricic acid. Illustrative of acid esters include acetyl citrate and mono- or di- stearyl citrates and the like. Suitable acid amides include for example N,N'-diethyl citric acid amide; N,N'-dipropyl citric acid amide; N-phenyl citric acid amide; N-dodecyl citric acid amide; N,N'-didocecyl citric acid amide and N-dodecyl malic acid amide. Preferably, component (c), when a saturated aliphatic polycarboxylic acid, is citric or malic acid. The salts include calcium malates, calcium citrate, potassium malate and potassium citrate.

Component (c) used in the present invention, when of type (iii), includes the agents mentioned to improve the compatibility which have at least one silicon atom which is bonded to a carbon atom via an oxygen bridge. For that purpose, at least an alkoxy group or an acetoxy group will usually be present in the silane. Moreover, silicon atoms which are bonded together via an oxygen bridge, i.e. siloxane groups, may be present in the silane derivative. In addition, the silane derivatives must have at least one of the following characteristic features, namely the presence in the molecule of one or more carbon-to-carbon double bonds or triple bonds, an amino group and/or a mercapto group. The carbon-to-carbon double or triple bond may be coupled directly to the silicon atom. The mercapto group or the amino group may not be coupled directly to a silicon atom. Examples of suitable silane derivatives are: gamma aminopropyl triethoxy silane; vinyl-tris-(2-methoxyethoxy) silane; 5-(bicycloheptenyl) triethoxy silane and gamma mer- capto-propyl trimethoxy silane.

Component (c) used in the present invention, when of type (iv), includes the agents mentioned for improving the compatibility which can be obtained by reacting a polyphenylene ether with, for example, chloroethyanoyl succinic anhydride; trimellitic anhydride acid chloride; chloroformyl succinic anhydride; 1-acetoxyacetyl-3,4-dibenzoic acid anhydride; trimellitic anhydride acid acetic anhydride and the acid chloride of terephthalic acid. The compounds formed can be purified by precipitation in methanol or acetone. These agents may be used in combination with primary or secondary amines, for example, butyl amine, dibutyl amine, n-octadecyl amine. Preferred are the polyphenylene ethers functionalized with trimellitic anhydride acid chloride and the method by which they can be obtained is described in Aycock et al., U.S. Pat. No. 4,600,741.

Component (c) used in the present invention, when of type (vi), includes the compounds mentioned in EP-A No.0 046 040 and EP-A No.0 147 874. Examples of these compounds are styrene maleic acid anhydride copolymers, styrene-maleic acid anhydride methacrylate terpolymers, styrene-maleic acid anhydride acrylate terpolymers, and the rubber-modified variants of these compounds.

Component (c) used in the present invention, when of type (vii), includes the compounds and their mode of preparation which are disclosed in Japanese Patent Application Nos. 59/059,724; 59/086,653 and 59/066,452. Component (c) of this type relates to the reaction product of (a) a 1,2-substituted olefinic compound with carboxylic group or acid anhydride group (for example, maleic acid anhydride), (b) a polyphenylene ether and (c) a radical initiator (for example, benzoyl peroxide).

The optional rubbery material (d) used in the present invention includes natural or synthetic polymeric materials elastic at room temperature. Illustrative of such are natural rubber, butadiene polymer, butadiene-styrene copolymer including random copolymer, block copolymer, graft copolymer and any other structures, isoprene polymer, chlorobutadiene polymer, butadiene-acrylonitrile copolymer, isobutylene polymer, isobutylene-butadiene copolymer, isobuty- lene-isoprene copolymer, acrylic ester polymer, ethylenepropylene copolymer, ethylene-propylene-diene copolymer, Thiokol rubber, polysulfide rubber, polyurethane rubber, polyether rubber such as polypropylene oxide, and epichlorohydrin rubber.

These optional rubbery materials may be prepared by any of known methods, such as emulsion polymerization or solution polymerization, using any of known catalysts such as peroxides, trialkyl aluminum, lithium halide or nickel catalysts. The rubbery materials may have various degrees of crosslinking and various ratios between micro-structures such as cis, trans and vinyl. They may be particles of various average sizes. Further, the copolymers may be random copolymers, block copolymers or graft copolymers. The rubbery materials may also be copolymers with other monomers such as olefins, dienes, aromatic vinyl compounds, acrylic acid, acrylic esters and methacrylic ester. These comonomers may be copolymerized in any manner of random copolymerization, block copolymerization or graft copolymerization. Illustrative of these monomers are, for instance, ethylene, propylene, styrene, chlorostyrene, alpha-methylstyrene, butadiene, isoprene, chlorobutadiene, butene, isobutylene, acrylic acid, methyl arcylate, ethyl acrylate, butyl acrylate, methyl methacrylate and acrylonitrile. Partially modified rubbery materials may also be used in the invention, such as polybutadiene having hydroxy or carboxy-modified terminals, and partially hydrogenated styrene-butadiene block copolymers.

When used, rubbery material (d) preferably is blended in an amount of 0 to 20 parts by weight to each 100 parts by weight of the total of components (a) and (b). Component (d) is used to improve impact resistance of a molded article. In the case of a molded article which does not contain component (d), surface appearance is remarkably improved, though improvement on impact resistance is not as good.

Optional filler (e) when used in the present invention includes inorganic and organic fillers which are usually added to plastics, such as glass fibers, carbon fibers, metal fibers, glass beads, asbestos, wollastonite, calcium carbonate, talc and barium sulfate. These may be used alone or in combination. Among these fillers, glass fibers are preferably used, which preferably have a fiber diameter of 6 to 30 microns and a fiber length of 30 microns or more.

When a filler (e) is used, the composition of the invention preferably contains 5 to 150 parts by weight of the filler per 100 parts by weight of the total amount of components (a) and (b). If the filler is contained in an amount outside the above range, it may not be possible to obtain a composition having the improved desired properties. That is, if the amount is less than 5 parts by weight, the desired reinforcing effect may not be attained. On the other hand, if the amount exceeds 150 parts by weight, surface appearance of a molded article is sometimes poor.

Regarding optional flame retardant (f), if phosphorous type flame retardants usually used in polyphenylene oxide resins or nitrogen type flame retardants usually used in polyamides are used herein, their effect is present but small. However, halogen type flame retardants yield excellent fire resistance. When optional antimony compound (g) is used together with optional flame retardant (f), fire resistance is further enhanced. Particularly, halogenated flame retardants such as brominated polystyrene, brominated polyphenylene oxide, brominated bisphenol series epoxy compounds, are proper because these do not cause bleeding. Above all, brominated polystyrene is a flame retardant which has such excellent heat stability that its discoloring is least when a resin composition resides in molding machine at 280° C. for 10 minutes. Compositions which contain neither component (f) nor component (g) may also be possible for use in a field where fire resistance is not required.

Further, the compositions may contain other additives which are usually used, such as pigments and stabilizers, as occasion demands.

The present invention essentially resides in that a mole-ratio of the terminal amino group and the terminal carboxy group in the polyamide utilized (hereinafter referred to as a terminal group ratio) is greater than 1 and component (c) is blended with components (a) and (b) yielding a compatibilized composition. Highly improved mechanical strength and excellent surface appearance of a molded article have unexpectedly been attained by the use of the compatibilized resin composition according to this invention.

Conventional polyamide resins have a terminal group ratio of 1 or less. In the case of polyamides for injection molding, an end-sealing agent is sometimes added to the polymerization components in order to properly control melt viscosity. The terminal group ratio of such polyamides is less than 1. When a polyamide having a terminal group ratio of more than 1 is used according to the invention, mechanical strength and appearance of a molded article are remarkably improved, compared with a polyamide having a terminal group ratio of 1 or less. This was not an expected result by any means. Decisive theoretical explanation for the above has not yet been found. According to electron micrography of molded articles, the average size of polyphenylene oxide particles dispersed in a polyamide matrix is small and size distribution is narrow in the present invention.

It is surprising that the difference in the terminal group ratio makes such a great difference in a molded article. The terminal group ratio of the polyamides utilized in the present invention should be greater than 1.01, preferably is 1.1 or more, more preferably is 1.3 or more.

The aforesaid components (a) to (c) alone, or with the optional components (d) to (g) alone or in combination, may be mixed in any order and heat melted to be injection molded. The resin compositions according to the invention yield molded articles having highly improved mechanical strength and surface appearance.

The invention is explained below in further detail by the examples, which should not be construed to limit the invention in any manner.

EXAMPLES 1-4 and COMPARATIVE EXAMPLES 1-3

Poly(2,6-dimethyl-1,4-phenylene) ether was used as component (a) in the Examples. Two types of nylon-6 were used as component (b). The first type of polyamide had a terminal amino group of $8.4 \times 10^{-5}$ mole/g and a terminal carboxyl group of $1.8 \times 10^{-5}$ mole/g. The second type of polyamide had a terminal amino group of $4.6 \times 10^{-5}$ mole/g. and a terminal carboxyl group of $7.0 \times 10^{-5}$ mole/g. Molecular weight of both polyamides was 13,000. A polyamide having a predetermined terminal group ratio was prepared by admixing these two types of polyamides in a proper mixing ratio. Similar results on a molded article were obtained using a polyamide whose terminal group ratio was adjusted during polymerization instead of the blended polyamide from the two types of polyamides.

Maleic anhydride was used as component (c).

A blend of the above components was extruded at 290° C. through a twin screw extruder with pressure-reducing vent to prepare pellets. Using the pellets, a molded article was produced by an injection molding machine set to a cylinder temperature of 280° C., an injection pressure of 1200 kg/cm$^2$ and a mold temperature of 80° C.

The molded article was evaluated by an Izod impact test according to JIS(Japanese Industrial Standard) K7110. Surface appearance was evaluated with the naked eye. A scanning electron microscope (SEM) was used to examine the state of polyphenylene ether dispersed in a polyamide matrix in the molded article. A small piece was cut out from the Izod test piece and processed by a microtome. It was then subjected to solvent etching in methylene chloride for 2 minutes while sonicating, and coated with gold. Subsequently it was observed by SEM.

The results are shown in TABLES I and II.

TABLE I

|  | Weight Ratio PPO/PA/Maleic Anhydride | NH$_2$/COOH Ratio in Polyamide | Izod Impact With Notch Kg cm/cm | Drop Impact Kg cm | Destruction State |
|---|---|---|---|---|---|
| Comparison 1 | 50/50 0.5 | 0.66 | 7 | 70 | brittle |
| Comparison 2 | 50/50 0.5 | 0.92 | 7 | 251 | brittle |
| Example 1 | 50/50 0.5 | 1.15 | 7 | 464 | ductile |
| Example 2 | 50/50 0.5 | 1.55 | 8 | 600 | ductile |
| Example 3 | 50/50 0.5 | 2.14 | 8 | 605 | ductile |
| Example 4 | 50/50 0.5 | 4.77 | 8 | 600 | ductile |
| Comparison 3 | 50/50 — | 1.55 | 4 | 50 | brittle |

PPO: Component (a)
PA: Component (b)

TABLE II

| | PPO Dispersion State | | |
|---|---|---|---|
| | Particle Size | Particle Size Distribution | Appearance of Molded Article |
| Comparison 1 | large | broad | bad |
| Comparison 2 | large | broad | bad |
| Example 1 | small | narrow | good |
| Example 2 | small | narrow | good |
| Example 3 | small | narrow | good |
| Example 4 | small | narrow | good |
| Comparison 3 | large | broad | bad |

Electron microscopic photographs of the molded articles obtained in Comparison 1 ($NH_2/COOH = 0.66$), Comparison 2 (0.92), Example 2 (1.55) and Example 4 (4.77) show the differences in particle size and size distribution of polyphenylene ether.

EXAMPLES 5-11 AND COMPARISON EXAMPLES 4-7

Compositions using the same polyphenylene ether resin and polyamide resins as in Examples 1-4 were prepared, and molded under the same conditions and subjected to similar tests. The results of the Izod impact test and particle size distribution and surface appearance observations are set forth in Tables III and IV.

Citric Acid, malic acid and n-phenyl citric amide were used as component (c). SBS (styrene-butadiene-styrene block copolymer, Cariflex TR 1101, Shell Chemical Company) was used as component (d).

TABLE III

| | | PPO/PA/Carboxylic compound/SBS (weight ratio) | NH2/COOH Ratio in Polyamide | Izod Impact with Notch Kg cm/cm |
|---|---|---|---|---|
| Comparison | 4 | 50/50/1 (citric acid)/0 | 0.66 | 5 |
| | 5 | 50/50/1 (citric acid)/10 | 0.66 | 7 |
| | 6 | 50/50/1 (citric acid)/10 | 0.92 | 15 |
| Example | 5 | 50/50/1 (citric acid)/10 | 1.15 | 25 |
| | 6 | 50/50/1 (citric acid)/10 | 1.55 | 28 |
| | 7 | 50/50/1 (citric acid)/0 | 1.55 | 6 |
| | 8 | 50/50/1 (malic acid)/10 | 2.14 | 27 |
| | 9 | 50/50/1 (PCA)/10 | 2.14 | 28 |
| | 10 | 50/50/1 (citric acid)/10 | 2.14 | 29 |
| | 11 | 50/50/1 (citric acid)/10 | 4.77 | 49 |
| Comparison | 7 | 50/50/0/10 | 1.55 | 4 |

PCA: n-phenyl citric amide

TABLE IV

| | | PPO/SBS Dispersion State | | Appearance of Molded Article |
|---|---|---|---|---|
| | | Particle Size | Distribution | |
| Comparison | 4 | large | broad | bad |
| | 5 | large | broad | bad |
| | 6 | large | broad | bad |
| Example | 5 | small | narrow | good |
| | 6 | small | narrow | good |
| | 7 | small | narrow | good |
| | 8 | small | narrow | good |
| | 9 | small | narrow | good |
| | 10 | small | narrow | good |
| | 11 | small | narrow | good |
| Comparison | 7 | Poor Dispersion | | particularly bad |

Election microscopic photographs photographs of the molded pieces according to Example 6, Example 11, Comparison 5 and Comparison 7 show the differences in particle size and size distribution of polyphenylene ether.

EXAMPLES 12-15 AND COMPARISON EXAMPLES 8-10

Compositions using the same polyphenylene ether resin and polyamide resins as in Examples 1-4 were prepared and molded under the same conditions and subjected to similar tests. The results of the Izod impact, warp and bending strength tests are set forth in Tables V and VI.

Citric acid was used as component (c). SBS (styrene-butadiene-styrene block copolymer, Cariflex TR 1101, Shell Chemical Company) was used as component (d). Chopped glass fibers were used as the filler (e).

TABLE V

| | | PPO/PA/Citric Acid/GF/SBS (weight ratio) | NH2/COOH Ratio of Polyamide | Izod Impact with Notch (kg cm/cm) |
|---|---|---|---|---|
| Comparison | 8 | 35/35/0.7/30/0 | 0.66 | 6.0 |
| | 9 | 35/35/0.7/30/0 | 0.92 | 6.4 |
| Example | 12 | 35/35/0.7/30/0 | 1.15 | 7.0 |
| | 13 | 35/35/0.7/30/0 | 1.55 | 7.4 |
| | 14 | 35/35/0.7/30/0 | 4.77 | 7.2 |
| | 15 | 35/35/0.7/30/5 | 1.55 | 9.6 |
| Comparison | 10 | 35/35/0/30/0 | 1.55 | 5.5 |

PPO: Component (a), polyphenylene ether
PA: Component (b), nylon-6
SBS: Component (d), stylene-butadiene-stylene block copolymer
GF: Component (e), chopped glass

TABLE VI

| | | Warp (mm) | Bending Strength (kg/cm$^2$) |
|---|---|---|---|
| Comparison | 8 | 14.8 | 1470 |
| | 9 | 9.8 | 1550 |
| Example | 12 | 4.0 | 1680 |
| | 13 | 2.2 | 1760 |
| | 14 | 3.0 | 1720 |
| | 15 | 3.1 | 1700 |
| Comparison | 10 | 18.2 | 1410 |

The results in Tables V and VI show the relation between the terminal group ratio and warp in Comparisons 8 and 9 and Examples 12, 13 and 14 where only the terminal group ratio of polyamide was varied. It is noted that the warp is remarkably decreased by making the amount of the terminal amine group greater than the amount of the carboxyl group.

EXAMPLES 16-17 AND COMPARATIVE AND EXAMPLES 11-12

Poly(2,6-dimethyl-1,4-phenylene) ether was used as component (a) in the Examples. Two types of Nylon-6 were used as component (b). The low amine content "regular" Nylon-6 had a terminal amine concentration of $3.6 \times 10^{-5}$ equivalents/g. and is available under the trade designation of Ultramid B3 from BASF Corporation. It had a Reduced Viscosity of 142 ml/g. calculated by dissolving 0.5 g of the polyamide in 90% formic acid, measured at 25° C. by means of Ubelohde viscosity. The "high amine content" Nylon-6 had a terminal amine concentration of $6.9 \times 10^{-5}$ equivalents/g. and is available under the trade designation of Capron XPN 1250 from Allied Chemical Corporation. It had a Reduced Viscosity of 149 ml/g. calculated by dissolving 0.5 g of the polyamide in 90% formic acid, measured at 25° C. by means of Ubelohde viscosity.

Polyphenylene functionalized with trimellitic anhydride acid chloride was used as component (c). Hydrogenated styrene-isoprene diblock copolymer was used as component (d).

A blend of the above components was extruded at about 275° C. through a Werner-Pfleiderer twin screw 28 mm extruder with pressure-reducing vacuum to prepare pellets. Using the pellets, a molded article was produced from each composition by an injection molding machine set to a cylinder temperature of about 275° C.

The molded articles were evaluated for Izod Impact strength and Charpy impact strength according to ASTM D 256, Puncture impact according to DIN 53443 and Flexural modulus and Flexural strength according to ASTM 790.

The results are shown in TABLES VII and VIII.

EXAMPLES 18-19 AND COMPARATIVE EXAMPLE 13

Poly(2,6-dimethyl-1,4-phenylene) ether was used as component(a) in the Examples. Three types of Nylon-6,6 were used as component (b). The low amine content "regular" Nylon-6,6 had a terminal amine concentration of $4.4 \times 10^{-5}$ equivalents/g. and is available under the trade designation of Fabelnly 45 APDH from Tubize Corp. It had a Reduced Viscosity of 132.5 ml/g. calculated by dissolving 0.5 g of the polyamide in 90% formic acid, measured at 25° C. by means of Ubelohde viscosity. The two high amine content Nylon-6,6s were experimental samples which had a terminal amine concentrations of $7.0 \times 10^{-5}$ equivalents/g. (for A) and $8.4 \times 10^{-5}$ equivalents/g. (for B), respectively. They had Reduced Viscosities of 132 ml/g and 128 ml/g calculated by dissolving 0.5 g of the polyamide in 90% formic acid, measured at 25° C. by means of Ubelohde viscosity.

Citric acid-1-hydrate was used as component (c). Styrene-butadiene-styrene triblock copolymer was used as component (d).

A blend of the above components was extruded at at about 275° C. through a Werner-Pfleiderer twin screw 28 mm extruder with pressure-reducing vacuum to prepare pellets.

In these Examples, a portion of each of the amines was added "downstream" of the extruder "throat", showing that the order of compounding the ingredients is not critical to the present invention.

Using the pellets thus formed, a molded article was produced from each composition by an injection molding machine set to a cylinder temperature of about 285° C.

The molded articles were evaluated for Izod impact strength and Charpy impact strength according to ASTM D 256, and Puncture impact according to DIN 53443.

TABLE VII

| Example | PPO/PPO-TAAC/PA/SI (weight ratio)[1] | Terminal Amine concentration | Izod Impact (J/M) | Izod Impact −30° C. (J/M) |
|---|---|---|---|---|
| Comparison 11 | 21.5/21.5/45/12 | $3.6 \times 10^{-5}$ eq./g. | 551 | 220 |
| Example 16 | 21.5/21.5/45/12 | $6.9 \times 10^{-5}$ eq./g. | 656 | 263 |
| Comparison 12 | 35/8/45/12 | $3.6 \times 10^{-5}$ eq./g. | 225 | 163 |
| Example 17 | 35/8/45/12 | $6.9 \times 10^{-5}$ eq./g. | 711 | 178 |

[1]All compositions also contained a processing aid (0.3 pbw); a stabilizer (0.4 pbw) and TiO$_2$ (0.5 pbw).

TABLE VIII

| Example | Charpy Impact (KJ/m$^2$) | Charpy Impact −30° C.[2] (KJ/m$^2$) | Puncture Impact (J) | Puncture Impact −30° C. (J) | Flexural Modulus | Flexural Strength (MPa) |
|---|---|---|---|---|---|---|
| Comparison 11 | 41.2 | 24.3 | 94 | 65 | 1710 | 86.0 |
| Example 16 | 47.8 | 32.9 | 97 | 47 | 2030 | 85.6 |
| Comparison 12 | 26.6 | 20.7 | 38 | 7 | 1620 | 73.0 |
| Example 17 | 45.7 | 27.9 | 73 | 10 | 1830 | 81.4 |

The results are shown in TABLE IX.

TABLE IX

| Example | PPO/Citric Acid-1-Hydrate/PA[1]/SBS (weight ratio)[2] | Izod Impact (J/M) RT | Izod Impact (J/M) −30° C. | Charpy Impact (KJ/M$^2$) RT | Charpy Impact (KJ/M$^2$) −30° C. | Puncture Impact RT | Puncture Impact −30° C. |
|---|---|---|---|---|---|---|---|
| Comparison 13 | 49/0.7/41/10 | 249 | 126 | 18.3 | 11.3 | 99 | 56 |
| Example 18 | 49/0.7/41(A)/10 | 321 | 162 | 19.9 | 12.2 | 144 | 64 |

TABLE IX-continued

| Example | PPO/Citric Acid-1-Hydrate/PA[1]/SBS (weight ratio)[2] | Izod Impact (J/M) | | Charpy Impact (KJ/M[2]) | | Puncture Impact | |
|---|---|---|---|---|---|---|---|
| | | RT | −30° C. | RT | −30° C. | RT | −30° C. |
| Example 19 | 49/0.7/41(B)/10 | 298 | 177 | 21.4 | 12.4 | 136 | 56 |

[1]10 pbw of each polyamide was precompounded; 31 pbw of each polyamide was added downstream
[2]All compositions also contained a stabilizer (0.4 pbw) and TiO$_2$ (0.5 pbw).

EXAMPLES 20–24 AND COMPARISON EXAMPLES 14–15

Compositions using the same polyphenylene ether resin and polyamide resins as in Examples 1–4 were prepared and molded under the same conditions and tested. The results of the flammability and warp tests are set forth in Table X.

Citric acid was used as component (c). Chopped glass fibers were used as component (e). Various flame retardants, listed in the Table, were used as component (f) and antimony trioxide was used as component (g).

TABLE X

| Example | PPO/PA/Citric Acid/ GF/Flame Retardant/ Sb$_2$O$_3$ (weight ratio) | NH2/COOH Ratio Of Polyamide | Warp (mm) | Flammability |
|---|---|---|---|---|
| Comparison 14 | 15/35/0.5/30/20 (TPP)/— | 1.55 | — | total loss by fire |
| Comparison 15 | 15/35/0.5/30/20(methyl cyanurate)/— | 1.55 | — | total loss by fire |
| Example 20 | 15/35/0.5/30/15 (BS)/5 | 1.55 | 2.8 | V-O |
| Example 21 | 15/35/0.5/30/15 (B-PPO)/5 | 1.55 | 3.2 | V-O |
| Example 22 | 15/35/0.5/30/15 (B-E)/5 | 1.55 | 3.5 | V-O |
| Example 23 | 15/35/0.5/30/15 (DBD)/5 | 1.55 | 3.2 | V-O |
| Example 24 | 15/35/0.5/30/20 (BS)/5 | 1.55 | 3.4 | V-O |

TPP: Triphenyl phosphate
BS: Brominated styrene (Pyrocheck 68PB, Nissan Ferroorganic Chemical Co.)
B-PPO: Brominated polyphenyleneoxide (PO-64P, Great Lakes Chemicals)
B-E: Brominated bisphenol type epoxy compound (EBR-787, Matsunaga Chemical Co.)
DBD: Decabromodiphenylether (EB-10FP, Matsunaga Chemical Co.)

The above mentioned patents, patent applications and other publications are incorporated herein by reference.

Other modifications and variations of the invention are possible and will occur to those skilled in the art in light of the above-detailed disclosure. It is to be understood, therefore, that changes may be made in the particular embodiments shown without departing from the spirit of the invention or its scope as defined in the appended claims.

We claim:

1. A resin composition comprising:
   (a) a polyphenylene ether resin;
   (b) a polyamide resin in which the amount of terminal amino group is greater than the amount of terminal carboxyl group; and
   (c) a compatibilizer compound for (a) and (b).

2. A composition according to claim 1 in which the polyphenylene ether is defined by the formula

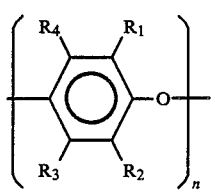

wherein R$_1$, R$_2$, R$_3$ and R$_4$ are a monovalent substituent selected from the group consisting of a hydrogen atom, a halogen atom, an alkyl group, an alkoxy group, a haloalkyl and haloalkoxy group in which at least 2 carbon atoms are present between a halogen atom and a phenyl ring with the exclusion of those having tertiary alpha-carbon atoms and n is an integer representing a degree of polymerization.

3. A composition according to claim 2 in which the polyphenylene ether is selected from the group consisting of poly(2,6-diethyl-1,4-phenylene) ether, poly(2-methyl-6-ethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dipropyl-1,4-phenylene) ether, and poly(2,6-dimethyl1,4-phenylene) ether.

4. A composition according to claim 3 in which the polyphenylene ether is poly(2,6-dimethyl-1,4-phenylene) ether.

5. A composition according to claim 1 in which the polyphenylene ether is a copolymer of two or more polyphenylene ether comonomers.

6. A composition according to claim 5 in which the polyphenylene ether copolymer is a copolymer in which part of the polyphenylene ether recurring unit is replaced with a tri-alkyl substituted phenol.

7. A composition according to claim 6 in which said tri-alkyl substituted phenol is 2,3,6-trimethyl phenol.

8. A composition according to claim 1 in which the polyamide is obtained by polymerizing a monoamino monocarboxylic acid or a lactam thereof having at least two carbon atoms between the amino and a carboxylic acid.

9. A composition according to claim 1 in which the polyamide is obtained by polymerizing a diamine, which contains at least two carbon atoms between the amino groups, and a dicarboxylic acid.

10. A composition according to claim 1 in which the polyamide is obtained by polymerizing a monoamino carboxylic acid or a lactam thereof with a diamine and a dicarboxylic acid.

11. A composition according to claim 8 in which the monoamino monocarboxylic acid or lactam thereof is selected from the group consisting of gamma aminocaproic acid, butyrolactam, pivalolactam, caprolactam, capryllactam, enantholactam, undecanolactam, dodecanolactam and 3- and 4-amino benzoic acids.

12. A composition according to claim 9 in which the diamine is of the formula $H_2N(CH_2)_nNH_2$ wherein n is an integer of from 2 to 16.

13. A composition according to claim 12 in which the diamine is selected from the group consisting of the trimethylene diamine, tetramethylene diamine, pentamethylene diamine, octamethylene diamine and hexamethylene diamine.

14. A composition according to claim 9 in which the dicarboxylic acid is aromatic.

15. A composition according to claim 14 in which the dicarboxylic acid is selected from the group consisting of isophthalic and terephthalic acids.

16. A composition according to claim 8 in which the dicarboxylic acid of the formula HOOC—Y—COOH wherein Y represents a divalent aliphatic group containing at least two carbon atoms.

17. A composition according to claim 16 in which the dicarboxylic acid is selected from the group consisting of sebacic acid, octadecanedioc acid, suberic acid, glutaric acid, pimelic acid and adipic acid.

18. A composition according to claim 1 in which the polyamide is selected from the group consisting of polyamide 6, polyamide 6/6, polyamide 11, polyamide 12, polyamide 6/3, polyamide 6/4, polyamide 6/10 and polyamide 6/12.

19. A composition according to claim 1, in which component (c) is selected from the group consisting of
(i) a compound having (1) one or more of a carbon-carbon double or triple, bonds and (2) one or more functional groups selected from carboxyl, acid anhydride, acid amide, imide, carboxylic ester or epoxy group;
(ii) a saturated aliphatic polycarboxylic acid or derivative thereof;
(iii) a silane compound having in its molecular structure both (a) at least one silicon atom which is bonded to a carbon atom via an oxygen bridge and (b) at least an ethylene carbon-to-carbon double bond, a carbon-to-carbon triple bond, or a functional group selected from the group consisting of an amine group and a mercapto group, the functional group not being bonded directly to the silicon atom or mixtures of (b);
(iv) a functionalized polyethylene ether consisting of a reaction product or (a) a polyphenylene ether and (b) a compound of the general formula (i)—Z—(ii), wherein (i) is at least a group of the formula [X—C(O)] with X being F, Cl, Br, I, OH, —OR, or —O—C(O)—R with R being alkyl or aryl, wherein (ii) is at least a carboxylic acid, acid anhydride, acid amide, imido, carboxylic acid ester, amino or hydroxyl group, in which the groups (i) and (ii) are covalently bonded together via a bridge Z, Z being a bivalent hydrocarbon radical;
(v) an oxidized polyolefin wax, optionally in combination with an organic phosphite;
(vi) a copolymer with units of a vinylaromatic compound and of an alpha-beta unsaturated dicarboxylic acid or dicarboxylic acid anhydride or a copolymer with units of a vinylaromatic compound of an imide compound of an alpha-beta unsaturated dicarboxylic acid;
(vii) the reaction product of (a) 1,2-substituted olefinic compound with carboxyl group or acid anhydride group, (b) a polyphenylene ether and (c) a radical initiator.

20. A composition according to claim 19, in which component (c) is selected from the group consisting of maleic anhydride, citric acid, maleic acid, N-phenyl citric polyphenylene functionalized with trimetallic anhydride acid chloride and citric acid-1-hydrate.

21. A composition according to claim 1, in which component (a) is present in the amount of from 5 to 80 parts by weight; component (b) is present in the amount of from about 95 to about 20 parts by weight based upon 100 parts by weight of (a) and (b); and component (c) is present in an amount of from about 0.01 to about 10 parts by weight of the total amount of (a) and (b).

22. A resin composition comprising:
(a) a polyphenylene ether resin;
(b) a polyamide resin in which the ratio of terminal amino groups to terminal carboxyl groups is greater than 1:01; and
(c) a compatibilizer compound for (a) and (b).

23. A composition according to claim 22 wherein the ratio of terminal amino groups to terminal carboxyl groups is greater than about 1.1.

24. A composition according to claim 22 wherein the ratio terminal amino groups to terminal carboxyl groups is greater than 1.3.

25. A composition according to claim 22 wherein the ratio of terminal amino groups to terminal carboxyl groups is from about 1.5 to about 4.77.

26. A composition according to claim 25 wherein components (a) and (b) are present in substantially equal amounts.

27. A composition according to claim 26 wherein component (a) is present in an amount of about 50 parts by weight, component (b) is present in an amount of about 50 parts by weight and component (c) is present in an amount of about 0.5 parts by weight.

* * * * *